US012756911B1

(12) United States Patent
Sherwood et al.

(10) Patent No.: US 12,756,911 B1

(45) Date of Patent: Oct. 6, 2026

(54) SYSTEM AND METHOD FOR PROVIDING IMAGING DEVICE ANALYSIS FOR SENSOR-DRIVEN LED CONTROL

(71) Applicants: Erik Sherwood, Ottawa (CA); Ronald Straz, Annadale, VA (US)

(72) Inventors: Erik Sherwood, Ottawa (CA); Ronald Straz, Annadale, VA (US)

(73) Assignee: ORBCOMM, Inc., Sterling, VA (US)

(*) Notice: Subject to any disclaimer, the term of this patent is extended or adjusted under 35 U.S.C. 154(b) by 0 days.

(21) Appl. No.: 18/984,177

(22) Filed: Dec. 17, 2024

Related U.S. Application Data

(63) Continuation of application No. 17/987,753, filed on Nov. 15, 2022, now Pat. No. 12,200,333.

(51) Int. Cl.

| | |
|---|---|
| ***H04N 23/00*** | (2023.01) |
| ***G06V 20/52*** | (2022.01) |
| ***H04N 7/18*** | (2006.01) |
| ***H04N 23/52*** | (2023.01) |
| ***H04N 23/56*** | (2023.01) |

(52) U.S. Cl.

CPC ............. *H04N 23/52* (2023.01); *G06V 20/52* (2022.01); *H04N 7/183* (2013.01); *H04N 7/188* (2013.01); *H04N 23/56* (2023.01)

(58) Field of Classification Search

CPC ........... H04N 7/00; H04N 20/00; H04N 23/00

See application file for complete search history.

(56) References Cited

U.S. PATENT DOCUMENTS

| | | | | |
|---|---|---|---|---|
| 9,848,173 | B1 * | 12/2017 | Pertsel | H04N 7/181 |
| 2017/0131718 | A1 * | 5/2017 | Matsumura | H04N 23/11 |
| 2019/0335074 | A1 * | 10/2019 | Malkes | H04N 23/74 |
| 2021/0195112 | A1 * | 6/2021 | Verghese | G06V 10/89 |

* cited by examiner

*Primary Examiner* — Maryam A Nasri

(57) ABSTRACT

A system and method for environmental condition detection and environmental adjustment procedure for an imaging device. According to a first preferred embodiment, the system preferably may include an imaging device having one or more LED light sources for illuminating the container interior. According to a preferred embodiment, the system may preferably first receive digital images from the imaging device along with one or more detected sensor inputs. Thereafter, the system may preferably calculate the potential for frost on or around the imaging device based on one or more sensor inputs which may include the imaging device temperature in combination with a door open signal, a detected light level or the like. The system may then preferably analyze the digital images during times of likely frost events using a frost detection algorithm which detects the presence of frost based on image characteristics derived from previously captured images with known frost levels.

11 Claims, 4 Drawing Sheets

SYSTEM AND METHOD FOR PROVIDING IMAGING DEVICE ANALYSIS FOR SENSOR-DRIVEN LED CONTROL

RELATED APPLICATIONS

The present application claims priority to U.S. patent application Ser. No. 17/987,753 filed Nov. 15, 2022, which further claims priority to U.S. Provisional Application No. 63/279,643 filed Nov. 15, 2021.

BACKGROUND AND FIELD OF THE PRESENT INVENTION

Field of the Present Invention

The present invention relates generally to a cargo imaging system. More specifically, the present invention relates to a system, method and apparatus for frost detection and mitigation for a reefer cargo container imaging system.

Background of the Invention

Generically, a refrigerated container ("reefer") is an intermodal container ("shipping container") used in intermodal freight transport that is capable of refrigeration for the transportation of temperature-sensitive cargo. Reefers generally include completely integrated refrigeration units which can be powered internally or externally. During road transport, the reefers are powered from diesel powered generators ("gen sets") which attach to the container. In operation, reefers can control temperatures ranging down to −65° C.

Reefers are generally well insulated, and their cooling systems can maintain set temperatures for extended periods of time despite the flow of heat energy that can travel through trailer walls and around gaps in door seals. Reefers can also control humidity by condensing moisture from the air. However, at various points during transport, large amounts of heat energy in the form of warmer, moist air can enter the cooled container creating frost all at once (e.g., during opening doors, loading uncooled cargo) and frost can be allowed to form.

Frost is an unwanted by-product of cooling, and it is damaging to certain perishable cargo such as fruits and vegetables. Additionally, where imaging devices are used, frost can form on lens surfaces obstructing interior views. For example, the imaging device disclosed in U.S. patent application Ser. No. 17/489,606 filed Sep. 29, 2021 may encounter frost conditions which can create obstructed views of the container interior.

What is needed is a system and method to allow transporters to track frosting events and to minimize the effects of frosting to imaging devices and the like.

SUMMARY OF THE PRESENT INVENTION

To address the shortcomings presented in the prior art, the present invention provides a system and method for frost detection and frost mitigation for an imaging device within a container interior. According to a first preferred embodiment, the system preferably may include an imaging device having one or more LED light sources for illuminating the container interior. The system may preferably also include a GPS sensor as well as sensors such as a door sensor, a light sensor, a temperature sensor, a vibration sensor and a humidity sensor.

According to a further preferred embodiment, the system may preferably first receive digital images from the imaging device along with one or more detected sensor inputs. The capture of the digital images may be initiated based on a pre-set schedule, a detected location, and/or sensor readings from one or more of the sensors. Thereafter, the system may preferably calculate the potential for frost on or around the imaging device based on one or more sensor inputs which may include the imaging device temperature in combination with a door open signal, a detected light level or the like.

The system may then preferably analyze the digital images. Preferably, the system may select the digital images to be analyzed based on time intervals when a determined frost potential level exceeds a predetermined frost potential level. The image analysis preferably may include the application of a frost detection algorithm which detects the presence of frost based on one or more image characteristics derived from previously captured images with known frost levels. Such analysis may be performed at the device or may be performed on a remote server.

According to a further preferred embodiment, the system may then initiate an imaging device defrost procedure in response to a detected frost level. Preferably, the imaging device defrost procedure may include operation of one or more of the LED light sources. Alternatively, other components of the system may be operated to change the device temperature or other characteristics to remove the detected frost. Prior to initiating any defrost procedure, the system may first determine whether sufficient battery power is available and signal a low battery signal alert when a defrost cannot be performed.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

DETAILED DESCRIPTION OF THE PREFERRED EMBODIMENTS

Figure 1:
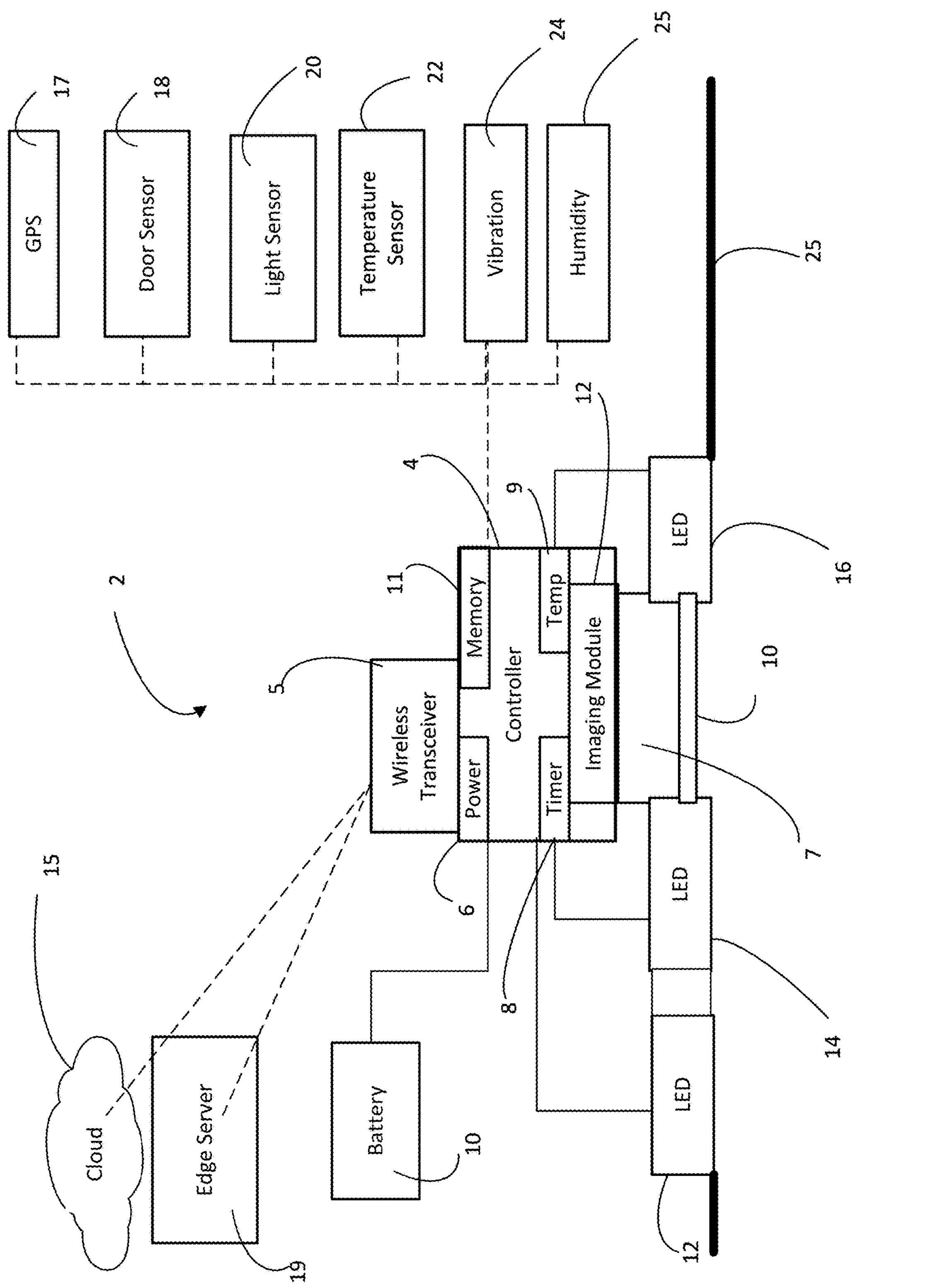
FIG. 1 is a functional diagram of an exemplary control system of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art. The descriptions, embodiments and figures used are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to"), rather than the mandatory sense (i.e., meaning "must"). Further, it should also be understood that throughout this disclosure, unless logically required to be otherwise, where a process or method is shown or described, the steps of the method may be performed in any order (i.e., repetitively, iteratively, or simultaneously) and selected steps may be omitted. It will be further understood that the terms "comprises," "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

The communication elements of the present invention as discussed below may include a wide variety of signal or data transmitting and receiving circuits, such as antennas, amplifiers, filters, mixers, oscillators, digital signal processors (DSPs), and the like whether illustrated or omitted.

With reference now to FIGS. 1-4, the present invention teaches a system, method and apparatus to track and minimize the effects of frost to cargo imaging devices and the like. As should be understood, the examples discussed herein are intended to be illustrative and any of a variety of alternative systems, embodiments and/or configurations may be used with the present invention without limitation.

With reference now to FIG. 1, a functional view of an exemplary imaging system 2 in accordance with aspects of the present invention is provided. As shown, a first preferred embodiment of the present invention may include an imaging system 2 which can be secured to a roof or wall 25 of a given container. In the example shown, the imaging system 2 may be placed on the exterior of a container roof 25 with imaging access through the container roof 25. Alternatively, the imaging sensor(s) of the present invention may be placed within a given container or within a given roof, floor or other exterior wall. Additionally, the individual components of the imaging system 2 (as discussed further below) may be combined within a single housing or may be distributed to different locations of a given cargo container.

As shown, the imaging system 2 may preferably include one or more lighting elements 12, 14, 16 which are positioned to project light into the container body for an imaging device 7 (e.g., digital image sensor or the like). The imaging device 7 may be a single sealed imaging body (as shown) or may include multiple imaging elements, chips and circuits. As shown, the imaging device 7 preferably also includes an exterior lens 10 (or other focusing element) for guiding light into the imaging device 7. The imaging device 7 with imaging module 12 preferably transforms detected light into electrical signals/digital images for processing, storage and transmission by the imaging system 2 as discussed further below.

The imaging system 2 may also include a main controller 4 for controlling the functions, operations, and modes of the system 2 along with a memory 11 for storing and executing instructions. Additionally, the system may include a wireless transceiver 5 for remotely transmitting/receiving data such as digital images to one or more remote Edge/processing servers 19 or to a device cloud 15 as discussed further below. The wireless transceiver 5 may preferably use any type of wireless protocol without limitation. These may include Bluetooth, BLE, Wi-Fi, 3-5G, satellite and the like. The wireless transceiver 5 may preferably communicate with and allow remote control and programming of the system 2 via remote server, PDA, smart phone, computer, and the like. Instructions and data may also be received and communicated via an input panel (not shown) which may be a fixed terminal or may include wired inputs such as USB inputs or the like.

The imaging system 2 preferably also includes a battery 10 and/or other power sources (i.e., solar, direct wired power etc.) for providing power to the controller 4 and other system elements. The controller 5 may preferably include one or more additional programs/circuits/modules for conducting the processes of the imaging system 2 as discussed further below. These modules may include modules such as a power control module 6 for receiving signals from the battery 5 (or other power source) and controlling/communicating to the controller detected battery power levels. Additionally, the controller 4 may include other modules such as timers 8 and other sub-modules. The controller 4 may also include inputs to receive detected temperatures from an imaging device body temperature sensor 9, as well as other sensors such as GPS/location sensors 17, door sensors 18, light sensors 20, temperatures sensors 22, vibration sensors 24, humidity sensors 25 and/or the like. Each of these sensors may be remotely positioned or integrated within a single housing with the controller 4.

Figure 2:
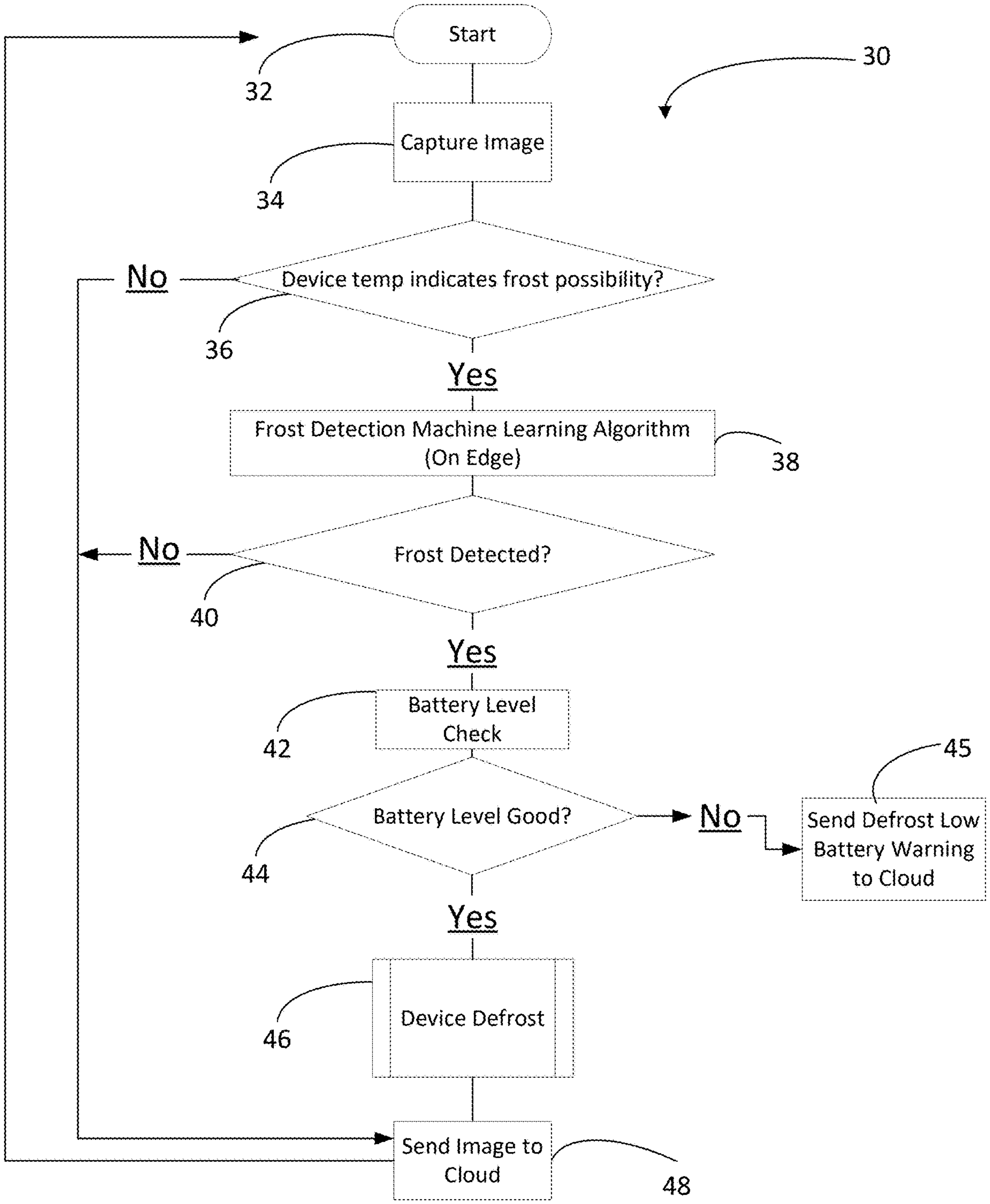
FIG. 2 is a flow chart illustrating an exemplary method in accordance with the present invention.

With reference now to FIG. 2, a first exemplary method 30 for processing data in accordance with the present invention shall now be discussed. At the first step 32, the system may initiate its primary function to capture images from within a given container. At a next step 34, the system may proceed to capture one or more digital images. The capture of digital images may be initiated according to a preset schedule. Alternatively, the capture of digital images may be initiated based on a detected location or in response to one or more detected sensor inputs exceeding threshold levels. For example, the system may initiate image detection in response to a detected temperature level, light level, door status signal, humidity level and/or other sensor inputs such as vibration levels. Alternatively, the system may be initiated according to a preset schedule or manually.

Add a next step 36, the system may determine whether a given sensor input (or combination of inputs) signals a potential for frost to form. According to a preferred embodiment, such as sensor input may be provided by a detection of an internal imaging device temperature. Alternatively, the sensor input may be provided by the detection of an internal imaging device temperature in combination with an input from another sensor. For example, a detected imaging device temperature in combination with a door open signal or a detected light level may be used to determine whether there is a possibility of frost. If such conditions do not indicate the possibility of frost, the system may proceed normally to send a given image to the cloud without additional steps or analysis.

According to further preferred embodiments, the system may additionally detect and a signal a potential for frost to form using outside weather data alone or in combination with the other data sources discussed above. Such weather conditions may include ambient conditions detected around the container or they may include weather data determined based on the container GPS location data and remote weather services (e.g., third party websites, data feeds and the like).

At a next step 38, if the system inputs indicate the potential for frost, the system of the present invention may then preferably proceed to apply a stored frost detection machine learning algorithm to one or more captured images. Such image analysis may preferably be performed on a remote server (e.g., an Edge server or the like) which is preferably trained to detect potential frost based on one or more image characteristics derived from previously captured images with known frost levels. At a next step 40, the system preferably may proceed to apply the frost detection algorithm to detected images and other inputs to determine whether frost is present. If NO, the system may then proceed back to step 48 and send detected images to the cloud.

If at step 40 frost is detected, the system may proceed at a next step 42 to determine whether sufficient battery power is available. If at a next step 44, the battery power level is below a preset threshold, the system may then proceed to step 45 and send a low battery signal to the remote server/cloud. If at step 44, sufficient battery power is detected, the system may proceed to step 46 and initiate an imaging device defrost procedure as discussed further below. Add a next step 48, the system may then send detected images to a remote server and proceed to step 32 and a restart of the frost detection algorithm.

Figure 3:
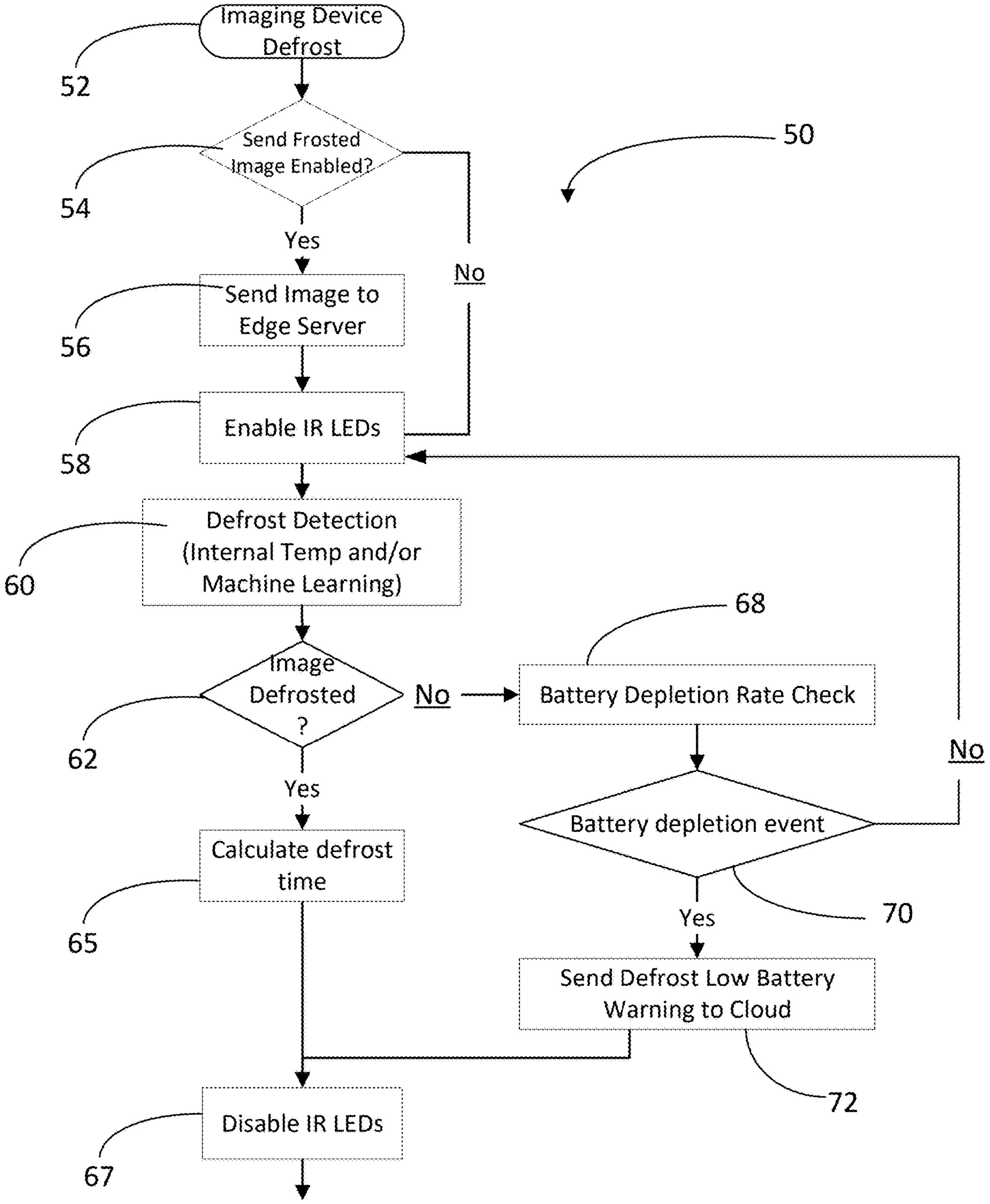
FIG. 3 is a flow chart illustrating a further exemplary method in accordance with the present invention.
Figure 4:
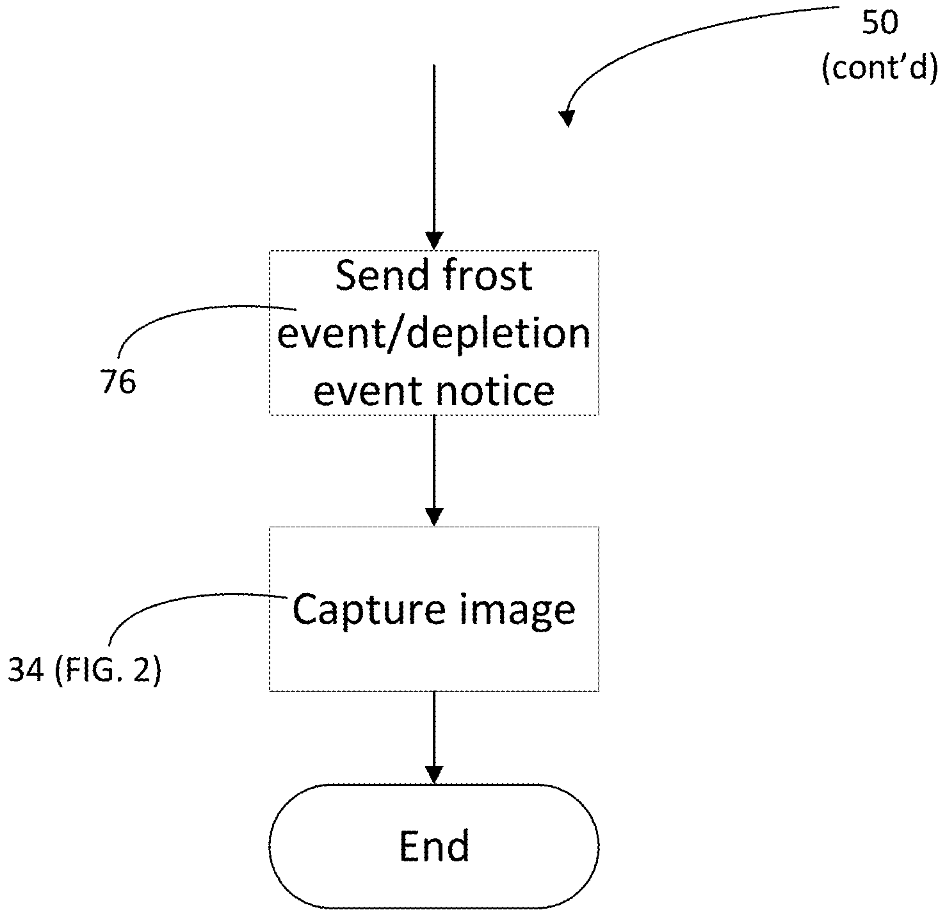
FIG. 4 is a flow chart illustrating further exemplary steps in accordance with the method shown in FIG. 3.

With reference now to FIGS. 3-4, a further exemplary method/algorithm 50 for removing detected frost shall now be discussed. At a first step 52, based on the detection algorithm discussed above, the system may initiate an imaging device defrost.

At a next step 54, the system may send further identified frosted images to the remote server (e.g., Edge server) to be used as a training set for further processing. Alternatively, the system may proceed directly to step 58 to trigger the operation of one or more of the LED light sources. According to preferred embodiments, the pattern and duration of the LED light sources being used (i.e., turned ON/OFF) may depend on one or more sensor inputs discussed above. Alternatively, the use, pattern and duration of turning on the LED light sources may be pre-set to selected lengths and patters based on pre-set times. Such pre-set patterns and times may further be adjusted by the system based on detected battery levels or other sensor inputs.

At a next step 60, the system may initiate a defrost detection algorithm which may be stored locally, in the cloud or it may be initiated and run at a dedicated remote/Edge server. Additionally, the defrost detection algorithm may be distributed. For example, where confirming a first defrost condition may be based on an internal sensor reading (e.g., an internal temperature of the imaging device), the defrost detection algorithm may be executed locally. Alternatively, where other steps of the defrost detection algorithm requires image analysis or the like, such analysis may be conducted locally, in the cloud or at a dedicated remote/Edge server depending on data rates and and/or the processing power required.

At a next step 62, the system may then determine whether the imaging device is defrosted. If YES, the imaging device is determined to be defrosted (i.e., no frost detected), the system may proceed (at step 65) to calculate the amount of time required to defrost the imaging device. At a next step 67, the system may then further proceed to turn off/disable the powered LEDS. At a next step 76, the system may then proceed to send notice of the detected frost and/or defrost event to the cloud. At a next step 46, the system may then return to capturing images as discussed at step 34 above.

If at step 62, the system determines that the imaging device is not defrosted (NO), the system (at a next step 68) may preferably proceed to determine whether the battery has been depleted beyond a set threshold (i.e., whether a battery depletion event has occurred). If YES, the system may proceed to transmit notice of the depletion event to the cloud (step 72). If NO (i.e., the battery is determined to be sufficiently charged), the system may then proceed back to step 58 to reinitiate the powering of the LEDs.

According to a preferred embodiment, the determination of the defrost condition of the imaging device may be determined by one or more methods. For example, the internal temperature of the imaging device may be used to determine whether the defrost process has been successful. Alternatively, or in addition thereto, the success of the defrost process may be determined at least in part at the remote/Edge server based on analysis of transmitted images.

According to alternative preferred embodiments, one or more of the controlled LEDs may operate at more than one frequency, wavelength and/or voltage. According to this embodiment, each frequency, wavelength and/or voltage of a given LED may be selected and powered based upon whether it is being used for imaging or defrosting.

While the invention has been illustrated and described as embodied in a particular imaging system, it is not intended to be limited to the details shown, since it will be understood that various omissions, modifications, substitutions and changes in the forms and details of the device illustrated and, in its operation, can be made by those skilled in the art without departing in any way from the spirit of the present invention. The scope of the present invention should be determined not by the embodiments illustrated, but by the appended claims and their legal equivalents.

What is claimed is:

1. A method for ambient temperature analysis and control within an imaging device which includes a plurality of LED light sources, a plurality of sensors, and a memory configured to store instructions, the method comprising:

receiving a plurality of digital images from the imaging device; wherein the capture of digital images is initiated in response to one or more detected sensor inputs, receiving a plurality of sensor inputs; wherein the plurality of sensor inputs are selected from a group of sensor inputs comprising: a GPS location; an imaging device temperature, a light level, a door status signal, a humidity level, and a vibration level;

calculating a first environmental potential level based on two or more sensor inputs;

performing image analysis of at least a first digital image obtained during a time interval when the first environmental potential level exceeds a first stored environmental level; wherein the image analysis comprises an environmental detection algorithm which detects the presence of an environmental condition based on one or more image characteristics derived from previously captured images with known environmental condition; and initiating an imaging device environmental adjustment procedure; wherein the imaging device environmental adjustment procedure comprises operation of one or more of the LED light sources.

2. The method of claim 1, wherein the capture of digital images is initiated at least in part based on a detected location.

3. The method of claim 2, wherein the two or more sensor inputs comprise: an imaging device temperature in combination with at least one other sensor input.

4. The method of claim 3, wherein the two or more sensor inputs comprise: an imaging device temperature in combination with a door open signal or a detected light level indicating an open door.

5. The method of claim 4, wherein the image analysis of the first digital image is performed on a remote server.

6. The method of claim 5, wherein the system processor determines whether sufficient battery power is available prior to initiating the imaging device environmental adjustment procedure; wherein if the battery power level is below a preset threshold, the system processor transmits a low battery signal to a remote server.

7. The method of claim 6, wherein the duration of operating the LED light sources is determined at least in part based on one or more detected sensor inputs.

8. The method of claim 7, wherein the pattern of operating the LED light sources is determined at least in part based on the one or more detected sensor inputs.

9. The method of claim 8, wherein the pattern and duration of operating the LED light sources are adjusted based on detected battery levels.

10. The method of claim 9, wherein a frequency or a wavelength of the LED light sources is adjusted based on one or more detected sensor inputs.

11. The method of claim 10, wherein a voltage of the LED light sources is adjusted based on one or more detected sensor inputs.

* * * * *